INVENTORS
RUDOLPH NAFTALI
ESTHER NAFTALI

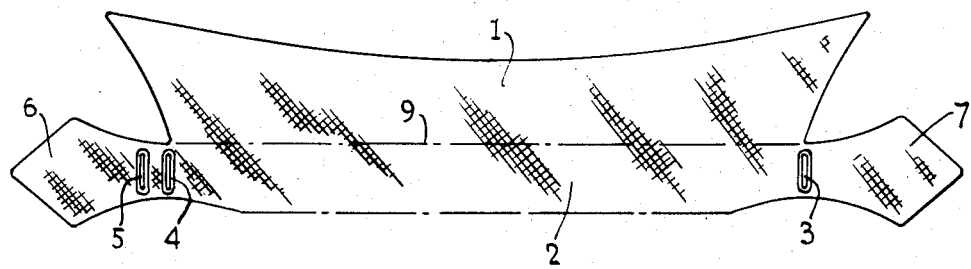
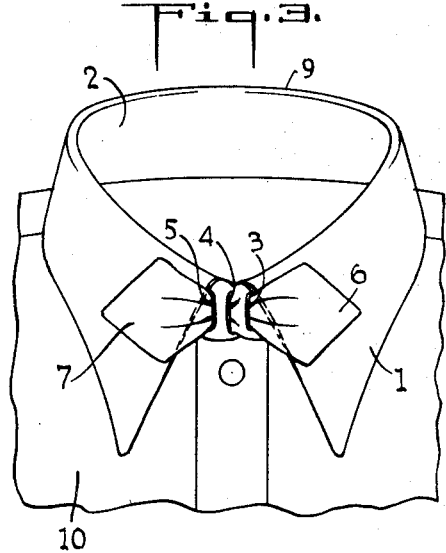
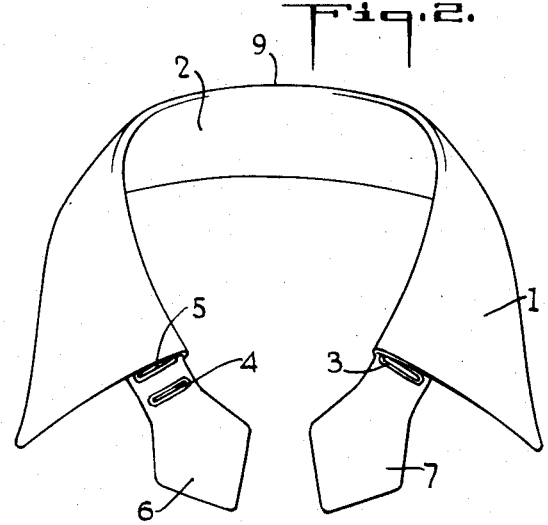
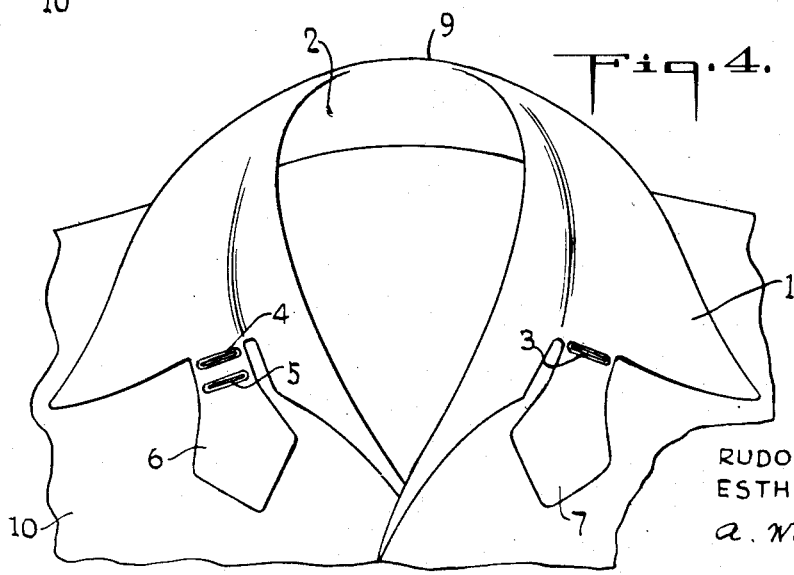
INVENTORS
RUDOLPH NAFTALI
ESTHER NAFTALI July 21, 1953 R. NAFTALI ET AL 2,645,777
COMBINATION COLLAR AND NECKTIE
Filed March 7, 1950 5 Sheets-Sheet 2

July 21, 1953 R. NAFTALI ET AL 2,645,777
COMBINATION COLLAR AND NECKTIE
Filed March 7, 1950 5 Sheets-Sheet 3

INVENTORS
RUDOLPH NAFTALI
ESTHER NAFTALI

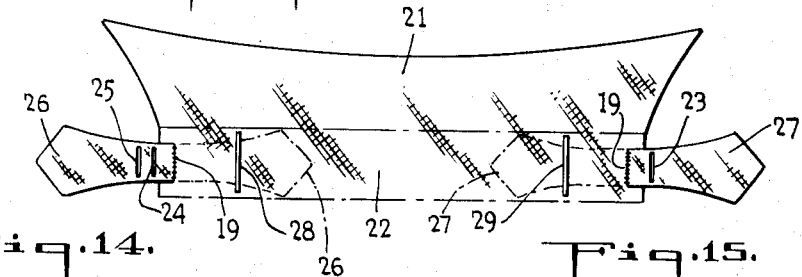
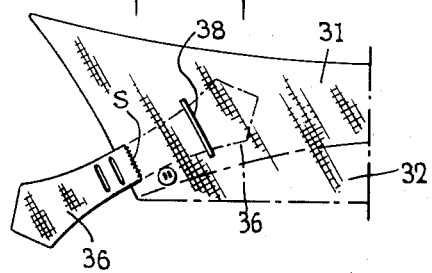
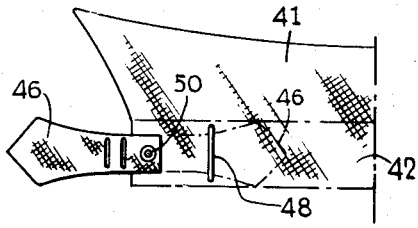
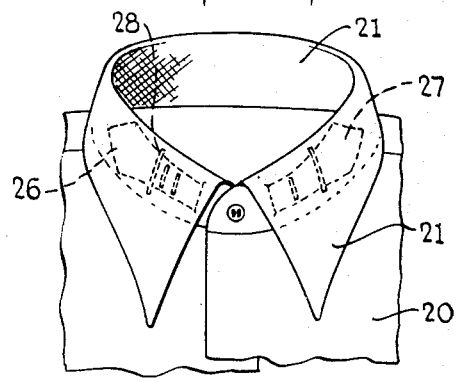
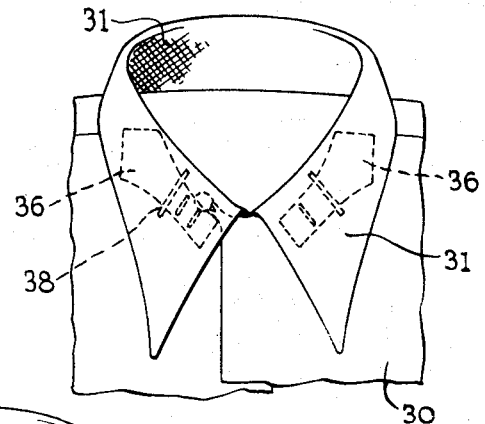
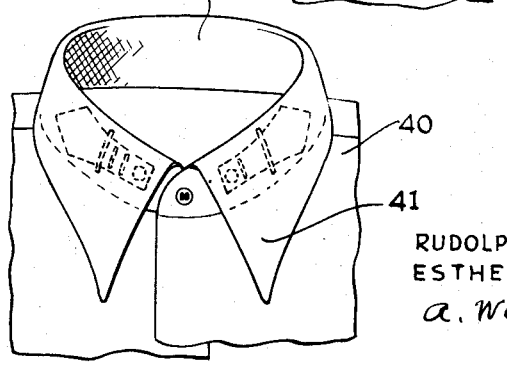
INVENTORS
RUDOLPH NAFTALI
ESTHER NAFTALI July 21, 1953    R. NAFTALI ET AL    2,645,777
COMBINATION COLLAR AND NECKTIE
Filed March 7, 1950    5 Sheets-Sheet 5
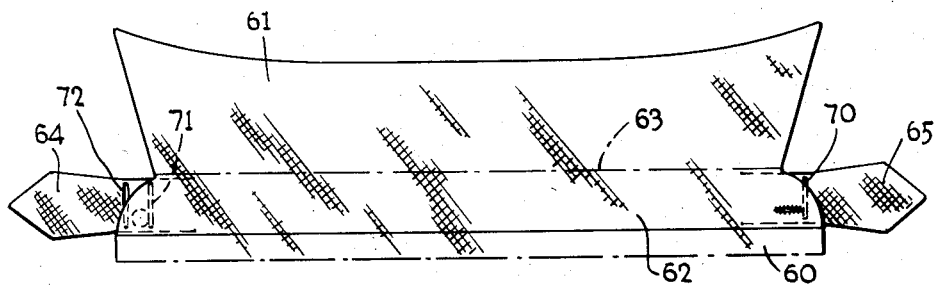
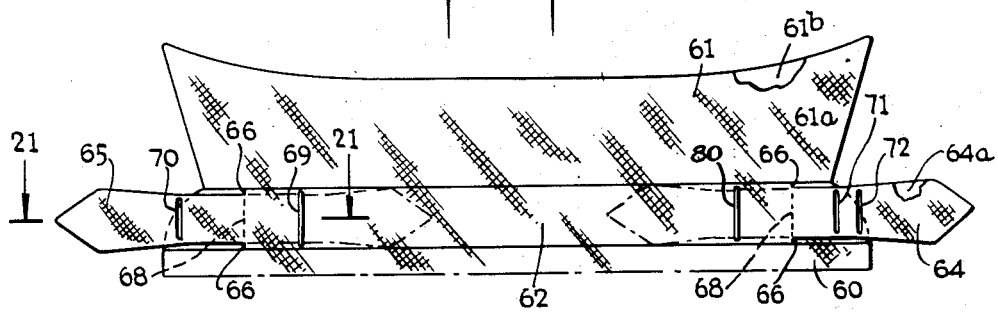
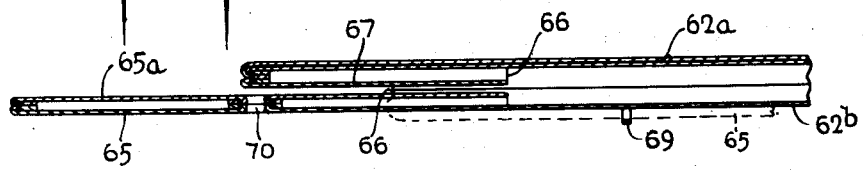
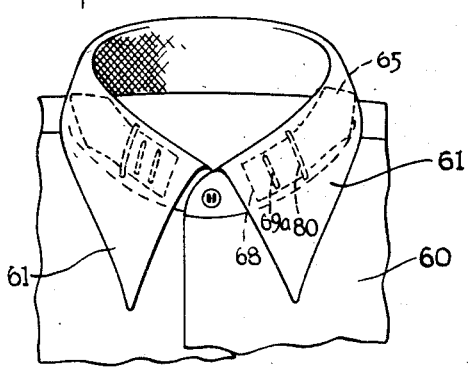
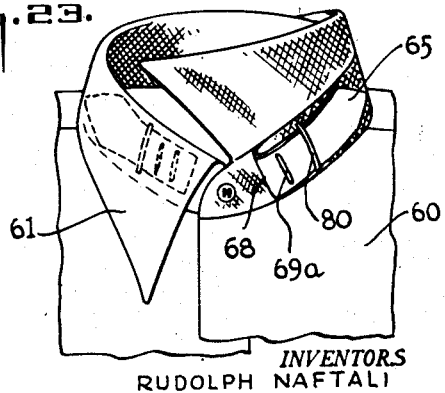
INVENTORS
RUDOLPH NAFTALI
ESTHER NAFTALI

Patented July 21, 1953

2,645,777

UNITED STATES PATENT OFFICE 2,645,777

COMBINATION COLLAR AND NECKTIE

Rudolph Naftali and Esther Naftali,
New Rochelle, N. Y.

Application March 7, 1950, Serial No. 148,206

1 Claim. (Cl. 2—130)

This invention relates generally to men's and women's wearing apparel of the type comprising shirts, sport shirts, blouses and the like. More particularly our invention is directed to a novel construction and arrangement of the neck encircling portions of such shirts, sport shirts and blouses in which a necktie member forms a part thereof.

One of the objects of our invention is to provide garments in which the neck encircling portions thereof comprise necktie means so constructed and arranged whereby a novel type of bow-knot may be quickly formed without the requirement of any special knowledge or skill on the part of the wearer which is usually required in forming the bow-knots of the customary bow ties.

Another object of our invention is to provide a garment suitable for sports wear, having a combination necktie and collar construction of the character described, which is so arranged that the wearer thereof will be able to open the collar of the garment without removing the necktie, which may, if desired, be temporarily hidden from view to thus present a pleasing and neat appearance.

A further object of our invention is to provide for use in combination with a shirt, sport shirt or blouse, a necktie member of novel construction and arrangement whereby the same may be easily and quickly made up into a bow-knot type of necktie without requiring any special skill on the part of the wearer.

Still another object of our invention is to provide a garment having a novel combination necktie and collar construction of the character described which shall be simple and inexpensive to manufacture, simple to manipulate and which shall be highly effective for the purposes intended.

Other objects of our invention will become apparent from the description of the invention to follow or will hereinafter be more particularly pointed out.

This application is a re-filing and continuation of our application, Serial No. 137,358, filed January 7, 1950 for Combination Collar and Necktie.

In the accompanying drawings,

Fig. 1 is a plan view of a combination collar and necktie portion of a garment constructed and arranged in accordance with my invention and illustrating the same in flat, unfolded position and apart from the garment;

Fig. 2 is a perspective view thereof showing how the combination collar and necktie portion appears when folded and adapted to encircle the neck of the wearer and before being made up into a bow-knot;

Fig. 3 is a perspective view similar to Fig. 2 but illustrating the same as forming a part of a sport shirt and with the necktie tabs made up into a bow-knot according to our invention;

Fig. 4 is a perspective view similar to Fig. 3, but illustrating the same after the bow-knot has been untied;

Figure 7:
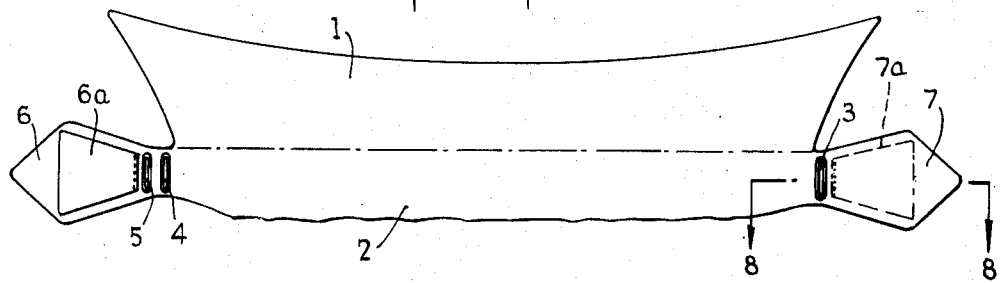
Fig. 7 is a plan view similar to Fig. 1 but illustrating a modified form of my invention.
Figure 8:
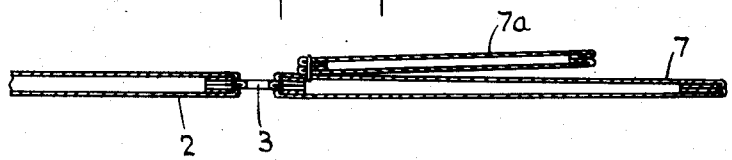
Fig. 8 is an enlarged cross-sectional view taken substantially along the line 8—8 of Fig. 7.
Figure 9:
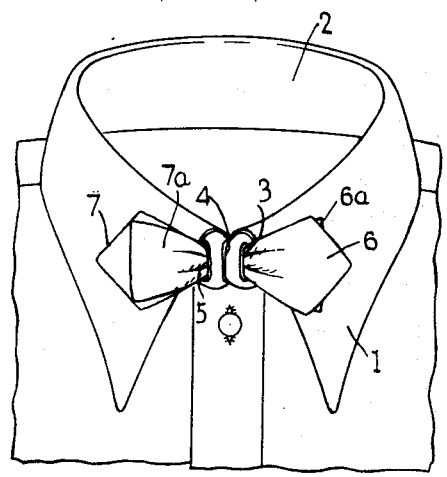
Figure 10:
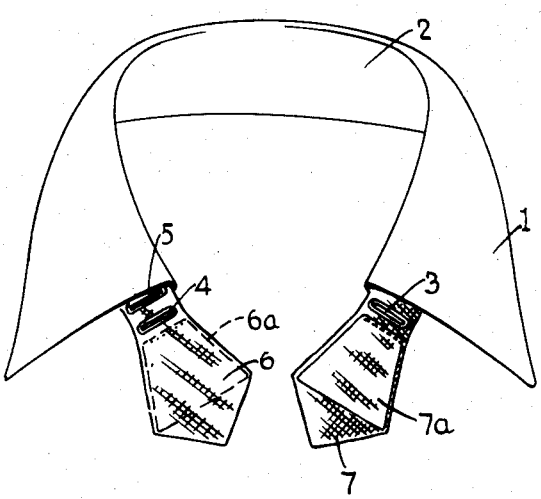
Figure 11:
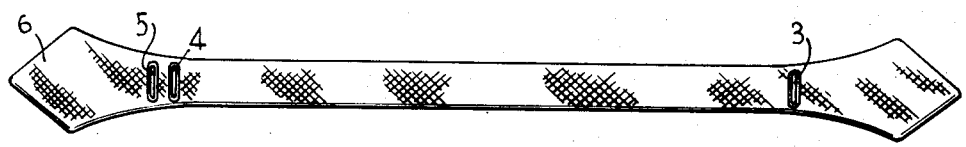
Figure 12:
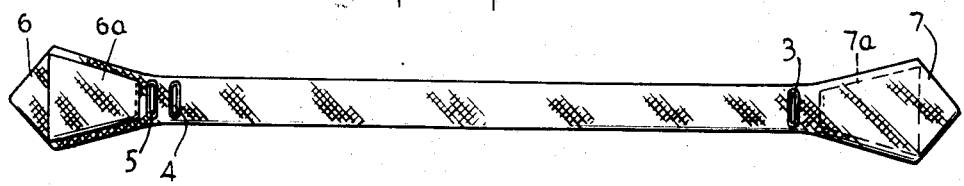

Figs. 9 and 10 are views similar to 3 and 2 respectively but, illustrating the modified form of construction according to Figs. 7 and 8;

Fig. 11 is a plan view of a necktie member made in accordance with our invention and independent of the collar portion and of the garment;

Fig. 12 is a view similar to Fig. 11 but illustrating a modified form of construction thereof;

Fig. 13 is a plan view similar to Figs. 1 and 7, but illustrating another modified form of our invention;

Figs. 14 and 15 are fragmentary views of the combination collar and necktie member shown in Fig. 13, but illustrating further modifications of construction thereof;

Figs. 16, 17 and 18 are perspective views of the forms of invention shown in Figs. 13, 14 and 15 respectively, illustrating the same attached to a garment and with the necktie tab portions hidden from view underneath the collar, when it is not desired to wear a necktie;

Fig. 19 is a plan view similar to Fig. 13 but showing a portion of the garment and illustrating a further modification of our invention;

Fig. 20 is a plan view of the reverse side thereof;

Fig. 21 is an enlarged cross-sectional view taken substantially along the line 21—21 of Fig. 20;

Fig. 22 is a perspective view similar to Figs. 16, 17 and 18 but showing the Figs. 19 and 20 form of our invention with the necktie tabs in hidden, ineffective position; and Fig. 23 is a perspective view similar to Fig. 22, but with a portion of the collar folded back to reveal the necktie tab hidden thereunder.

Referring now in detail to the drawings and more particularly to Figs. 1 through 6 thereof, we have shown a combination collar and necktie member constructed and arranged in accordance with out invention as applied to an article of wearing apparel such as, for example, a man's shirt 10. As shown, the neck encircling portion of the shirt 10, comprises in combination a neckband part 2 and a collar part 1 which may be integral therewith as shown. The neckband part 2 may be permanently attached to the shirt 10 in any suitable manner well known to the art. As best seen in Fig. 1, the neckband part 2 is provided with integral outwardly extending necktie tabs 6 and 7, of predetermined length and suitably shaped, the purpose and function of which will soon become apparent. Spaced inwardly from the ends of the tabs, 6 and 7, are slotted through openings 4 and 3 respectively, transversely disposed with respect to the neckband part 2. It is noted that the said openings 4 and 3 are disposed approximately in alignment with the corresponding transverse edges of the collar part 1. One of the tabs, such as, for example, the tab 6, is provided with an additional slotted opening 5, parallel to the opening 4 and spaced outwardly therefrom a predetermined distance.

The material of the neck encircling portion of the shirt 10, as just described may be of any suitable style, quality and color to match or contrast with the shirt as desired and may consist of any number of layers or plies of material according to the desire of the manufacturer.

In Fig. 2 we have illustrated the combination collar and necktie member with the collar part 1 folded along the fold line 9 of Fig. 1, to overlie the neckband part 2. It is noted that the tabs 6 and 7 extend beyond the transverse edges of the collar part 1.

In Fig. 4 we have shown the combination collar and necktie member as attached to a sport shirt and have illustrated the manner in which the said shirt may be worn with the neck portion relatively open and without the tabs 6 and 7 being made up into a necktie, the said tabs serving to enhance the sport-like appearance of the garment.

Figure 5:
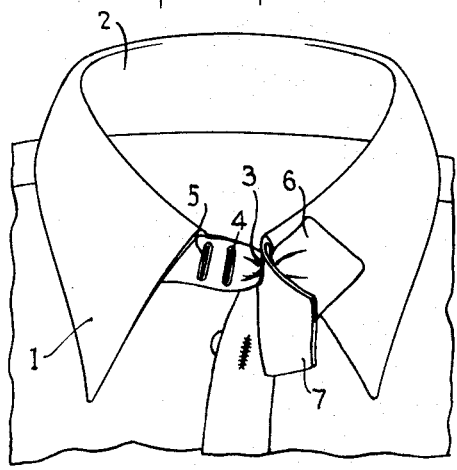
Figs. 5 and 6 are perspective views, similar to Figs. 3 and 4, but illustrating the progressive steps employed in making the bow-knot.
Figure 6:
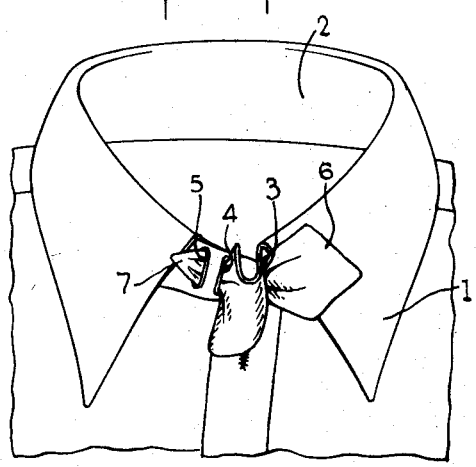

In Figs. 5 and 6 we have illustrated the steps which are performed in making the tabs 6 and 7 into a bow tie which when completed will appear as shown in Fig. 3. The end of the tab 6 is first pulled forwardly through the opening 3 from the inner side to appear as in Fig. 5. Then the tab 7 is first passed through the opening 4 in a direction from front to rear and thereafter pulled through the opening 5 from the rear in a forward direction as noted in Fig. 6. When the tab 7 has been pulled all the way through the said opening 5, the wearer of the garment will be neatly attired in a bow tie type of neckwear as clearly shown in Fig. 3.

It is thus seen from the foregoing description that when made up the bow knot will be prevented from becoming accidentally untied, due to the size of the openings as compared with the size of the tabs and at the same time the bow knot can be readily and quickly untied when desired by simply reversing the procedure hereinbefore described for making up the bow knot.

It is noted that in the Figs. 1 through 6 form of our invention when the necktie is made up into a bow knot, both tabs 6 and 7 are of the same shape and there is only one tab on either side. Many types of bow ties heretofore on the market when made up are provided with pairs of superposed tabs on either side of the knot, each pair of such pairs of tabs consisting of a tab with a pointed end and a tab with a squared end. If it is desired to more closely approximate the appearance of the standard type of bow tie when made up, one of the tabs, 6 and 7 may be provided with a squared end, leaving the other pointed. Also, if it is desired to provide the superposed tab appearance, the Figs. 1 through 6 form of construction may be modified as shown in Figs. 7 through 10 by attaching an auxiliary tab member 7a to undersurface of the tab 7, and an auxiliary tab member 6a to the outer surface of the tab 6. The auxiliary tab members 6a and 7a are provided with squared outer ends and may be permanently attached by lines of stitching at the inner ends thereof as shown in Figs. 7, 8 and 10. The same procedure is employed in making the bow knot for the Figs. 7 through 10 form of our invention as employed in the Figs. 1 through 6 form.

In the forms of our invention as shown in Figs. 1 through 10 as just described, instead of wearing the shirt as shown in Fig. 4, the tabs 6 and 7 may be folded over inwardly to lie between the collar 1 and the neckband 2 to be hidden from view and thus appear like any ordinary sport shirt when open at the neck and worn without a necktie. To insure that the inwardly folded tabs will be retained in hidden position, and in accordance with our invention, we provide suitable loop members 28 and 29 as shown in Fig. 13 of the drawings, wherein we have illustrated a modified form of construction for the tabs. It is understood, however, that similar loop members 28 and 29 may be employed in conjunction with the disclosures shown in Figs. 1 through 10 of the drawings.

Referring now more specifically to Figs. 13 and 16 we have shown a modified form of invention in which instead of the tabs being integral with the neckband part, we provide independent tab members 26 and 27 which are attached at their inner ends to the neckband 22 by stitching 19. When it is desired to wear the shirt 20 without any necktie the tabs 26 and 27 may be folded inwardly from the positions shown in full lines in Fig. 13 to the dot-dash line positions and retained against displacement by the loops 28 and 29. It is noted that the stitching 19 which attaches the tabs 26 and 27 to the neckband 22 are spaced inwardly from the transverse ends of the said neckband part 22. By such arrangement, when the tabs 26 and 27 are folded inwardly to be hidden from view, the folded edges will be spaced inwardly from the transverse edges of the collar part and thus be completely hidden, as clearly shown in Fig. 16, wherein a portion of the shirt 20 is shown.

As in Figs. 1 through 10 form of our invention and for the same purpose and function the tab 27 is provided with a through slotted opening 23 and the tab 26, with a pair of through slotted openings 24 and 25.

In Figs. 15 and 18 we have shown a further modification of our invention which is similar to the Figs. 13 and 16 forms except that the tie tabs 46, instead of being permanently attached to the neckband 42 are removably mounted thereon by any suitable removable connecting means, such as, for example, any standard type of cooperating snap fastener elements on the said tabs and on the said neckband part. Loop members 48 serve to maintain the tie tabs 46 in ineffective hidden position between the collar part 41 and the neckband part 42.

While in the Figs. 13 and 16 forms of our invention we have shown the necktie tabs as being attached to the neckband part, if desired the same form of necktie tabs as the tabs 26, 27 and 46, may be attached to the collar part 31 instead of to the neckband part 32, as clearly illustrated in Figs. 14 and 17. It is noted that in every other respect the Figs. 14 and 17 design of tie tab, designated by the numeral 36 is the same as the tabs 26, 27 and 46 except that the attachment thereof is to the collar part. In this form the retaining loop 38 is carried by the collar part 31. When the tabs 36 are folded backwardly to ineffective position they will be completely hidden from view between the collar and neckband parts as best seen in Fig. 17, where a portion of the shirt 30 is shown.

In Figs. 19 through 23 we have shown how our invention may be applied to a different type of shirt construction, the design, purpose and function of the necktie tabs being the same as hereinbefore described in connection with the forms of invention illustrated. In this form of invention we combine the feature of forming the necktie tabs as a continuation of the neckband part and which are at the same time so designed that when folded to hidden position between the collar and neckband parts, the folded edge will be set in from the transverse edges of the collar and thus be more completely hidden from view. As noted in the drawings there is provided a shirt 60 having the usual shirt body and having a neck encircling portion comprising a collar part 61, and an integral neckband part 62 laterally extending therefrom and adapted to be folded on the fold line 63 so that the said collar 61 will overlie the said neckband 62. The neckband 62 may form a part of or be attached to the shirt body.

The collar part 61 may comprise an inner layer 61a and an outer layer 61b suitably stitched together in any well known manner. Similarly the neckband part 62 may comprise inner and outer layers 62a and 62b respectively. The outer layer 62b of the neckband 62 is provided with tie tab portions 64 and 65, similar in purpose to that of the tie tabs 6 and 7 shown in Figs. 1 and 2, and freely extending in opposite directions from fixed points indicated by the numerals 66. Facing inner layers 64a and 65a coextensive with the tabs 64 and 65 respectively are stitched to the said tabs to provide a neat and finished appearance for the said tabs.

Similar outer facings 67 may be provided to overlie that portion of the unattached neckband part underlying the tabs 64 and 65.

It is thus seen from the above described construction that when the tabs 64 and 65 are folded inwardly on the fold line 68 in alignment with the fixed points 66 the said tabs and the folded edges thereof will be completely hidden from view underneath the collar 61 as noted in Figs. 22 and 23. Strap or loop members 69 and 80 may be provided on the neckband 62 to retain the tabs 64 and 65 respectively in folded hidden position. As in all the forms of necktie tab constructions shown and heretofore described one of the tabs, such as, for example, the tab 65 is provided with a single transverse slotted opening 70 and the other tab 64 is provided with a pair of such slotted openings 71 and 72 for the purposes heretofore explained in connection with the tabs 6, 7, 26, 27, 36 and 46.

In view of the distinctive and novel type of bow knot produced in accordance with our invention it may be found desirable in certain instances to construct a neck encircling member without the collar part shown and described in our other forms of invention, so that the novel type of bow knot according to our invention may be had without special shirt construction. To this end, as shown in Fig. 11, we provide a neck encircling member comprising a neck-band portion of a predetermined length and terminating in opposed neck-tie tab ends similar to the tabs 6 and 7, (see Fig. 1) and in which one of said tabs is provided with a transverse slotted opening similar to the opening 3 of the tab 7, and the other tab is provided with a pair of slotted openings similar to the openings 4 and 5 of Fig. 1. This neck encircling member may be worn with any standard style of shirt or blouse now being manufactured and will make up into a bow knot in the same manner as hereinbefore described in connection with the Figs. 1 through 4 form of our invention and will appear as in Fig. 3.

In Fig. 12 I have shown the same neck encircling member as disclosed in Fig. 12 but with the addition of auxiliary tab members, similar in design and function to that of the auxiliary tabs 6a and 7a shown in Fig. 7.

The invention may be varied in its constructional details without departing from the inventive idea; the drawing will therefore be understood as being intended for illustrative purposes only and not in a limiting sense. We therefore reserve the right to make such changes as the exigencies of commercial practice may dictate, and which fall fairly within the scope of the appended claim.

We claim:

In an article of wearing apparel, the combination of a neck encircling portion comprising a collar part having its free transverse edges disposed at the front thereof, a neckband part, a first tie tab at one end of said neckband part and projecting beyond one transverse edge of said collar part, a second tie tab at the other end of said neckband part and projecting beyond the other transverse edge of said collar part, said first tie tab having securing means for securing said second tie tab thereto, said last named securing means comprising an opening in said projecting portion of said first tie tab and spaced inwardly from the free end thereof, said second tie tab having securing means for securing said first tie tab thereto, said last named securing means comprising a first opening located in said projecting portion of said second tie tab and spaced inwardly from the end thereof, and a second opening in said projecting portion of said second tie tab and spaced inwardly from said last named first opening, said opening in said first tie tab being adapted to receive said second tie tab therethrough, said first opening of said second tie tab being adapted to receive said first tie tab therethrough in one direction and said second opening of said second tie tab being adapted to receive said first tab therethrough after it has been passed through said first opening but in the opposite direction for forming a simulated bow tie.

RUDOLPH NAFTALI.
ESTHER NAFTALI.

References Cited in the file of this patent

UNITED STATES PATENTS

| Number | Name | Date |
|---|---|---|
| 22,800 | Heard | Feb. 1, 1859 |
| 530,974 | Stecker | Dec. 18, 1894 |
| 1,042,220 | Hall | Oct. 22, 1912 |
| 1,281,076 | Savarese | Oct. 8, 1918 |
| 1,816,745 | Reed | July 28, 1931 |
| 1,843,533 | Zatz | Feb. 2, 1932 |
| 2,385,638 | Norwood | Sept. 25, 1945 |
| 2,502,921 | Bryant | Apr. 4, 1950 |

References Cited in the file of this patent

FOREIGN PATENTS

| Number | Country | Date |
|---|---|---|
| 662,753 | France | Mar. 25, 1929 |
| 791,944 | France | Oct. 7, 1935 |